United States Patent Office 3,580,875
Patented May 25, 1971

3,580,875
POLISHING COMPOSITION
John M. Behnke, Newark, N.J., assignor to
Bristol-Myers Company, New York, N.Y.
No Drawing. Filed Dec. 7, 1967, Ser. No. 688,662
Int. Cl. C09g 1/10
U.S. Cl. 260—23
2 Claims

ABSTRACT OF THE DISCLOSURE

A composition used for polishing surfaces such as wood and Formica, comprised of synthetic wax, a combination of resins, a combination of plasticizers comprising a fatty acid amine soap and a fatty alcohol amine sulfate, and a non-aqueous solvent system.

---

This invention relates to a polishing composition which is useful in polishing surfaces such as wood and Formica.[1] Specifically, the invention comprises a composition which does not contain water. The compositions of this invention are not limited to the application of polish to floors, but are intended for use with various surfaces including furniture, Formica surfaces and a variety of floor tiles, except asphalt tile.

The compositions of the present invention are comprised of a synthetic wax, a fatty acid, a volatile amine, a combination of resins, a fatty alcohol amine sulfate and a non-aqueous solvent system.

Many polishing compositions have been prepared heretofore which included various combinations of ingredients including waxes, emulsifiers, solvents and resins. It is well-known that the presence of water in such compositions which are intended for use on a wood surface is deleterious to the wood.

In the past, the wood floor polishes available commercially have been either paste form or fluid wax form which must be buffed in order to produce a shiny appearance. In order to avoid the problem of the deleterious effect of water on a wood surface, liquid polishing compositions have been prepared which omit water. These products have generally been only fairly satisfactory, and have left much to be desired. Some of these prior art compositions have not provided a highly polished surface which compares with a buffed paste wax surface. Other such compositions do not have proper adherence to the substrate and, accordingly, have an adverse effect on the type of shine obtained and also require more frequent polishing.

It is an object of this invention to provide a composition which avoids the disadvantages of having water in contact with a wood surface to be treated, at the same time providing the surface with a dry, bright gloss which requires no buffing, and which affords a protective polished coating.

It is a further object of this invention to provide a composition which affords protection of the surface to be treated against the penetration of water, ink, alcoholic beverages, and the like.

The above-mentioned objects, as well as others which will become readily apparent to those skilled in the art, are accomplished by providing a composition which is comprised of a synthetic wax, a fatty acid, a volatile amine, a combination of resins, a fatty alcohol amine sulfate and non-aqueous solvents.

In order to overcome the above-listed disadvantages and in order to provide an improved polishing composition, extensive experimentation was undertaken with formulations comprising combinations of resins. Many of the tested formulations have very short and streaky wipe, the general rub-out become very tacky within twenty (20) seconds, and the dried finish showed insufficient surface anchoring, producing also a hard, brittle film of streaky formulation. These formulations also had poor wetting power toward waxy remnants of the substrate resulting in a low adhesion of the dried film toward the substrate. Efforts were expanded to effect improvements in the adhesion and surface anchoring effects, the flow properties and the rub-out or wiping properties. It was found, quite unexpectantly, that these improvements could be accomplished by the addition of a combination of a fatty alcohol amine sulfate and a fatty acid amine soap to the non-aqueous solvent system of the fluid polish composition. The fatty acid and the volatile amine are reacted to form a fatty acid amine soap. The fatty acid amine soap and the fatty alcohol amine sulfate are employed in the present composition as plasticizers for the resins. Fatty alcohol amine sulfates and fatty acid amine soaps have heretofore been used in aqueous systems as emulsifiers. However the combination of a fatty alcohol amine sulfate and a fatty acid amine soap has not been used in a non-aqueous system as a plasticizer for a resin. This combination of ingredients not only acts as a plasticizer for the resins of the composition, but also enhances the flow-out, gloss, depth, anti-tack, levelling and adhesion properties. Furthermore, in order to obtain improved lubricity and flow properties during application in addition to improved surface characteristics, the fatty acid is partly saponified with an amine "in situ" in solution, to which the fatty alcohol amine sulfate is added. This combination, in the absence of water, results in much improved characteristics during application of the polish to surfaces which have been previously painted, lacquered or varnished.

The polish compositions contemplated by the present invention may be said to contain a wax (0.2–1.0%), a resin system (4.5–14.0%), a plasticizer system (0.3–5.0%) and a non-aqueous solvent system (80.0–95.0%).

The wax used in the present polishing compositions are synthetic waxes known as polyvinyl ether hardwaxes. More specifically these are polyvinyl higher fatty alcohol ethers having 12–18 carbon atoms in the fatty alcohol chain, having a melting point between 45–55° C. One such wax is known as Hoechst Wax V which is polyvinyl octadecyl ether, available from Hoechst Chemical Corporation. The amount of wax may vary depending on the degree of shine and other properties desired, but amounts up to 1.0% and greater are usable. The preferred range is 0.2–0.5% by weight.

The resin system and the wax are in effect coating materials. The resin system is comprised of two types of resins. The first type is referred to as Shanco Resins (300 Series), which are partially esterified esters of terpene and phenol having a melting point of 130–158° C. and an acid value of 40–70. The preferred resin known as Shanco Resin 300 is a partially esterified ester of terpene and phenol having a melting point of 149–152° C., and an acid value of 55–65, and a specific gravity of 1.08 at 20° C.

The second type of resin is represented by the compounds disclosed in U.S. Pat. 2,744,884, the disclosure of which is herein incorporated by reference. These compounds are esters of acrylic and methacrylic acid and polymers and copolymers of these esters. A preferred resin is a copolymer of N-tert-alkylaminoalkyl ester of acrylic and methacrylic acid, wherein the alkyl groups have a total of not over 23 carbon atoms, known as Acryloid B-67.

[1] Formica is the registered trademark of the Formica Division of American Cyanamid Company for a laminated plastic comprising phenolic resin and melamine formaldehyde resin impregnated paper.

The amount of resins used may vary as shown in the following:

TABLE 1

| Resin | Weight percent | |
|---|---|---|
| | Operable range | Preferred range |
| Shanco Resin 300 | 0.1–5.0 | 0.5–3.0 |
| Acryloid Resin B–67 | 4.4–9.0 | 6.0–7.5 |

The fatty alcohol amine sulfates of the present invention are produced by adding sulfur trioxide to a fatty alcohol and reacting at a temperature range of 110–140° C. in a nitrogen atmosphere. Water is formed by the reaction, which eventually stops, and this forms a sulfuric acid mono-ester. Unreacted acid is then neutralized with an amine, such as ethanolamine or with ammonium hydroxide. If sulfur trioxide is replaced by sulfamic acid, the ammonium salt is formed directly.

The generic formula of such fatty alcohol sulfate salts is R—OSO$_3$—M, wherein R is an alkyl radical containing 11–21 carbon atoms, and M is a salt forming radical such as sodium, potassium, ammonium or amine.

The fatty alcohol amine sulfates of the present invention are Dupont oil soluble products having the trade names Duponol G, Duponol WS and Duponol OS. Duponol G is alkyl diethyl cyclohexylamine sulfate wherein the alkyl groups contains 12 carbon atoms. Duponol WS contains Duponol G and a C(12–18) fatty alcohol. Duponol OS contains Duponol G and a solubilizer comprised of technical grade oleyl alcohol rich in cetyl unsulfonated C–16 alcohols. Of the above-mentioned fatty alcohol amine sulfates, Duponol OS is preferred since it yields optimal results, especially in gloss and application characteristics such as rub-out, flow properties, freedom from excessive tack and adhesion to the wood substrate. It has also been shown to be definitely superior in regard to freedom from haze strata and iridescence.

The amount of the fatty alcohol amine sulfate used in the present composition will vary from 0.1–2.0% with a range of 0.3–1.5% being preferred.

The fatty acid used is a member of the group consisting of saturated fatty acids of the class $C_nH_{2n+1}COOH$ and unsaturated fatty acids of the class $C_nH_{2n-1}COOH$, having 12–22 carbons such as lauric acid, stearic acid, isostearic acid and oleic acid.

The amine used in combination with the fatty acid may be any volatile amine. Such amines as morpholine, diethylethanolamine, dimethylethanolamine, 3-methoxy-n-propylamine are among the preferred amines.

The amounts of fatty acid and amine which may be used will vary according to the following table:

TABLE 2

| Ingredient | Weight percent | |
|---|---|---|
| | Operable range | Preferred range |
| Fatty acid | 0.15–2.00 | 0.25–1.50 |
| Amine | 0.05–1.00 | 0.10–0.50 |

An important aspect of the present invention is the use of a mixture of medium and high boiling solvents having almost identical K–B values but different rates of evaporation. The solvent system must be of an aliphatic type since aromatics generally tend to damage or dissolve the original floor varnish or lacquer. However, the solvents should have sufficient solvent power for the constituents of the polish composition. The boiling point should not be too low for reasons of flammability and ease of application, preferably higher than the boiling point of water. When applied upon a substrate a considerable portion of the solvent should evaporate rapidly enough to form an intermediate gel, preventing too much penetration into the substrate. If the evaporation proceeds too quickly, the polish cannot be applied evenly enough and streaks and bubbles will occur on drying. If the solvent evaporates too slowly the composition will penetrate into the substrate with a possible loss of gloss and overall protection.

The present composition comprises a blend of two aliphatic solvents both having a boiling point not below 240° F., and a minimum Kauri-Butanol value of 36. The relative amounts of medium and high boiling solvents may be varied according to the surface to be treated and the results desired. Table 3 lists some of the properties of the preferred medium and high boiling solvents.

TABLE 3

| Properties | Amsco Special Naphtholite | Amsco 46 Spirits |
|---|---|---|
| Initial boiling point, ° F | 244 | 312 |
| 50% boiling point, ° F | 263 | 342 |
| Dry end point, ° F | 288 | 393 |
| ASTM, end point, ° F | 291 | 396 |
| Flash point, ° F | 53 | 104 |
| K–B Value (Kauri-Butanol) | 40.0 | 42.5 |
| Specific gravity, 60° F | .7608 | .7972 |
| Evaporation in minutes | 10 | 120 |

The ethyl alcohol, which of course is included in the solvent system, is used primarily as a solvent bridge for the fatty acid amino soap in solution. The use of the alcohol aids in providing a clear polish solution. Other low boiling lower alkyl alcohols such as isopropanol may also be used in place of the ethyl alcohol.

The non-aqueous solvent system is comprised of a mixture of hydrocarbon solvents and anhydrous denatured ethyl alcohol. One of the hydrocarbon solvnets is a class of high boiling petroleum distillates which are saturated aliphatic hydrocarbons having a minimum Kauri-Butanol value of 36. The K–B value is a relative indication of solvent power. The preferred solvent in this class is known as Amsco 46 Spirits which has a K–B value of 42.5, a specific gravity at 20° C. of .7972 and a flash point of 104° F.

The other hydrocarbon solvent is a class of medium boiling petroleum distillates which are saturated aliphatic hydrocarbons having a minimum Kauri-Butanol value of 36. The preferred solvent in this class is known as "Special Naphtholite" which has a K–B value of 40.0, a specific gravity at 60° F. of .7608 and a flash point of 53° F. The total amount of solvent may vary from 70–95% with a range of 80–90 being preferred.

The fragrance employed to mask the odor of the solvent, is optional. Concentrate 718–C, a Bouquet for naphtha available from Rhodia, Inc. of New York, N.Y., is preferred for the polish compositions of the invention.

The nature and objects of the invention have been adequately described. However, for a fuller understanding the following examples are presented as further illustrations of the invention but should not be construed in a limiting sense.

EXAMPLE I

The following composition represents the preferred embodiment of the invention.

| Ingredient: | Weight percent |
|---|---|
| Hoechst wax "V" (polyvinyl octadecyl ether) | 0.20 |
| Stearic acid triple pressed | 0.50 |
| Shanco resin 300 | 2.40 |
| Duponol OS | 1.00 |
| Acryloid resin B–67 | 7.00 |
| Special naphtholite | 17.00 |
| Amsco 46 spirits | 67.00 |
| Denatured ethyl alcohol (anhydrous) | 4.70 |
| Morpholine | 0.10 |
| Concentrate 718 Bouquet for naphtha | 0.10 |
| Total | 100.00 |

Preparation: All solids are dissolved in the Amsco 46 Spirits and Special Naphtholite and the Duponol OS is added slowly while the temperature is brought to about 160° F. with continuous stirring. When all the solids have been dissolved, the heating is discontinued and the morpholine is added. After allowing the reaction to proceed for approximately thirty minutes and the temperature has been reduced to about 120° F., the ethyl alcohol is added. After the solution has cooled to about 100° F., the fragrance is added. The resultant product is a dry, bright wood polish containing no water and is ready for application to the surface to be treated. After application a dry, bright gloss is produced with a film of considerable hardness and shine which requires no buffing.

The following compositions were prepared according to the procedure given in Example I with the same general results obtained as in Example I.

EXAMPLE II

| Ingredient: | Weight percent |
|---|---|
| Hoechst wax "V" (polyvinyl octadecyl ether) | 1.0 |
| Stearic acid triple pressed | 0.1 |
| Morpholine | 0.1 |
| Shanco resin 300 | 0.1 |
| Acryloid resin B-67 | 4.4 |
| Duponol OS | 0.1 |
| Special naphtholite | 23.1 |
| Amsco 46 spirits | 70.0 |
| Denatured ethyl alcohol (anhydrous) | 1.0 |
| Concentrate 718 Bouquet for Naphtha | 0.1 |
| Total | 100.0 |

EXAMPLE III

| Ingredient: | Weight percent |
|---|---|
| Hoechst wax "V" (polyvinyl octadecyl ether) | 1.0 |
| Stearic acid triple pressed | 2.0 |
| Morpholine | 1.0 |
| Shanco resin 300 | 5.0 |
| Acryloid resin B-67 | 9.0 |
| Duponol OS | 2.0 |
| Special naphtholite | 19.0 |
| Amsco 46 spirits | 55.9 |
| Denatured ethyl alcohol (anhydrous) | 5.0 |
| Concentrate 718 Bouquet for Naphtha | 0.1 |
| Total | 100.0 |

EXAMPLE IV

| Ingredient: | Weight percent |
|---|---|
| Hoeschst wax "V" (polyvinyl octadecyl ether) | 0.2 |
| Stearic acid triple pressed | 0.2 |
| Morpholine | 0.5 |
| Shanco resin 300 | 0.5 |
| Acryloid resin B-67 | 6.0 |
| Duponol OS | 0.3 |
| Special naphtholite | 22.0 |
| Amsco 46 spirits | 67.2 |
| Denatured ethyl alcohol (anhydrous) | 3.0 |
| Concentrate 718 bouquet for naphtha | 0.1 |
| Total | 100.0 |

EXAMPLE V

| Ingredient: | Weight percent |
|---|---|
| Hoechst wax "V" (polyvinyl octadecyl ether) | 0.5 |
| Stearic acid triple pressed | 1.5 |
| Morpholine | 0.5 |
| Shanco resin 300 | 3.0 |
| Acryloid resin B-67 | 7.5 |
| Duponol OS | 1.5 |
| Special naphtolite | 20.7 |
| Amsco 46 spirits | 60.0 |
| Denatured ethyl alcohol (anhydrous) | 4.7 |
| Concentrate 718 Bouquet for Naphtha | 0.1 |
| Total | 100.0 |

EXAMPLE VI

| Ingredient: | Weight percent |
|---|---|
| Hoechst wax "V" (polyvinyl octadecyl ether) | 0.3 |
| Stearic acid triple pressed | 1.0 |
| Morpholine | 0.4 |
| Shanco resin 300 | 2.5 |
| Acryloid resin B-67 | 7.0 |
| Duponol OS | 1.0 |
| Special naphtholite | 15.7 |
| Amsco 46 spirits | 65.0 |
| Denatured ethyl alcohol (anhydrous) | 4.0 |
| Concentrate 718 Bouquet for Naphtha | 0.1 |
| Total | 100.0 |

EXAMPLE VII

| Ingredient: | Weight percent |
|---|---|
| Hoechst wax "V" (polyvinyl octadecyl ether) | 1.5 |
| Stearic acid triple pressed | 2.0 |
| Morpholine | 0.8 |
| Shanco resin 300 | 3.5 |
| Acryloid resin B-67 | 8.0 |
| Duponol OS | 1.9 |
| Special naphtholite | 17.2 |
| Amsco 46 spirits | 61.0 |
| Denatured ethyl alcohol (anhydrous) | 4.0 |
| Concentrate 718 Bouquet for Naphtha | 0.1 |
| Total | 100.0 |

EXAMPLE VIII

| Ingredient: | Weight percent |
|---|---|
| Hoechst wax "V" (polyvinyl octadecyl ether) | 1.8 |
| Lauric acid | 0.3 |
| Diethylethylolamine | 0.4 |
| Shanco resin 300 | 3.0 |
| Acryloid resin B-67 | 6.5 |
| Duponol OS | 1.0 |
| Special naphtholite | 19.2 |
| Amsco 46 spirits | 63.0 |
| Denatured ethyl alcohol (anhydrous) | 4.7 |
| Concentrate 718 Bouquet for Naphtha | 0.1 |
| Total | 100.0 |

EXAMPLE IX

| Ingredient: | Weight percent |
|---|---|
| Hoechst wax "V" (polyvinyl octadecyl ether) | 0.3 |
| Oleic acid | 1.0 |
| Dimethylethanolamine | 0.4 |
| Shanco resin 300 | 3.0 |
| Acryloid resin B-67 | 7.5 |
| Duponol OS | 1.5 |
| Special naphtholite | 20.0 |
| Amsco 46 spirits | 61.6 |
| Denatured ethyl alcohol (anhydrous) | 4.6 |
| Concentrate 718 Bouquet for Naphtha | 0.1 |
| Total | 100.0 |

I claim:
1. A composition for polishing surfaces consisting essentially of 0.1 to 1.5 weight percent of polyvinyl octadecyl ether; 0.05 to 1.00 weight percent of an amine selected from the group consisting of morpholine, diethylethanolamine, dimethylethanolamine, 3-methoxy-n-propylamine; 0.1 to 2.0 weight percent of a fatty alcohol sulfate salt having the formula R—OSO$_3$—M wherein R is an alkyl radical containing 11–21 carbon atoms and M is selected from the group consisting of sodium, potassium, ammonium and amine; 0.15 to 2.00 weight percent of a member of the group consisting of saturated fatty acids of the class $C_nH_{2n+1}COOH$ and unsaturated fatty acids of the class $C_nH_{2n-1}COOH$, having 12–22 carbon atoms; 0.1 to 5.0 weight percent of a partially esterified ester of terpene and phenol having a melting point of 130–158° C. and an acid value of 40–70; 4.4 to 9.0 weight percent of a member of the group consisting of esters of acrylic and methacrylic acid homopolymers and copolymers of said esters, said esters having the formula

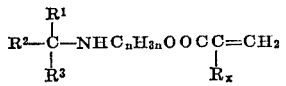

where $R^1$, $R^2$, and $R^3$ are alkyl groups having a total of not over 23 carbon atoms, $R^x$ is a member of the class consisting of hydrogen and the methyl group and $n$ is an integer from two to three, there being two carbon atoms between nitrogen and oxygen atoms, 70 to 95 weight percent of a non-aqueous solvent which is a mixture of high and medium boiling petroleum distillates and a lower alkyl alcohol wherein the high and medium boiling petroleum distillates are saturated aliphatic hydrocarbons having a minimum Kauri-Butanol value of 36.

2. A composition according to claim 1 wherein the amine is morpholine and the fatty acid is stearic acid and wherein the fatty alcohol sulfate is alkyl diethyl cyclohexylamine sulfate wherein the alkyl group contains 12 carbon atoms.

References Cited
UNITED STATES PATENTS

| | | | |
|---|---|---|---|
| 2,273,780 | 2/1942 | Dittmar | 260—28 |
| 2,839,482 | 6/1958 | Geen | 260—23 |
| 3,163,547 | 12/1964 | Vietor | 106—6 |
| 3,296,167 | 1/1967 | Turner et al. | 260—29.6 |
| 3,393,078 | 7/1968 | Lockhart et al. | 106—8 |
| 3,417,041 | 12/1968 | Brown et al. | 260—28.5 |

OTHER REFERENCES

Speel: "Textile Chemicals and Auxiliaries, 1952, p. 306.

DONALD E. CZAJA, Primary Examiner

R. A. WHITE, Assistant Examiner

U.S. Cl. X.R.

106—8; 260—23R, 33.4R, 33.6UR

UNITED STATES PATENT OFFICE
CERTIFICATE OF CORRECTION

Patent No. 3,580,875              Dated May 25, 1971

Inventor(s) John M. Behnke

It is certified that error appears in the above-identified patent and that said Letters Patent are hereby corrected as shown below:

Column 4, line 27, "solvnets" should read -- solvents --.
Column 7, line 8, "$H_{3n}$" should read -- $H_{2n}$ --; line 9, "$R_x$" should read -- $R^x$ --.

Signed and sealed this 22nd day of February 1972.

(SEAL)
Attest:

EDWARD M. FLETCHER, JR.            ROBERT GOTTSCHALK
Attesting Officer                   Commissioner of Patents